United States Patent
Wolff et al.

(10) Patent No.: US 10,791,277 B2
(45) Date of Patent: Sep. 29, 2020

(54) METHODS AND APPARATUS FOR OPTIMIZING IMAGE ACQUISITION OF OBJECTS SUBJECT TO ILLUMINATION PATTERNS

(71) Applicant: Cognex Corporation, Natick, MA (US)

(72) Inventors: Robert Wolff, Sherborn, MA (US); Thomas Penny, Pepperell, MA (US); Marcus Große, Jena (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/127,732

(22) Filed: Sep. 11, 2018

(65) Prior Publication Data
US 2020/0084384 A1    Mar. 12, 2020

(51) Int. Cl.
*H04N 5/232* (2006.01)
*G03B 21/14* (2006.01)
(Continued)

(52) U.S. Cl.
CPC ....... *H04N 5/23296* (2013.01); *G03B 21/142* (2013.01); *G06T 5/002* (2013.01); *H04N 5/2258* (2013.01); *H04N 5/23232* (2013.01)

(58) Field of Classification Search
None
See application file for complete search history.

(56) References Cited

U.S. PATENT DOCUMENTS

2006/0072914 A1* 4/2006 Arai ................. G01C 3/18
                                                    396/106
2010/0289879 A1* 11/2010 Sinzinger ............. A01K 29/00
                                                    348/46
(Continued)

FOREIGN PATENT DOCUMENTS

DE    10 2017 113475 A1    12/2017
EP         19196605        2/2020

OTHER PUBLICATIONS

Große, Phd Thesis. Untersuchungen zur korrelationsbasierten Punktzuordnung in der stereophotogrammetrischen 3D-Objektvermessung unter Verwendung von Sequenzen strukturierter Beleuchtung [Correlation-based point assignment studies in stereophotogrammetric 3D object measurement using sequences of structured illumination.] Submitted to the Council of the Physics and Astronomy Faculty of the Friedrich Schiller University Jena. 2013; 127 pages.
(Continued)

*Primary Examiner* — James M Hannett
(74) *Attorney, Agent, or Firm* — Wolf, Greenfield & Sacks, P.C.

(57) ABSTRACT

The techniques described herein relate to methods, apparatus, and computer readable media configured to determine parameters for image acquisition. One or more image sensors are each arranged to capture a set of images of a scene, and each image sensor comprises a set of adjustable imaging parameters. A projector is configured to project a moving pattern on the scene, wherein the projector comprises a set of adjustable projector parameters. The set of adjustable projector parameters and the set of adjustable imaging parameters are determined, based on a set of one or more constraints, to reduce noise in 3D data generated based on the set of images.

20 Claims, 10 Drawing Sheets

(51) Int. Cl.
*G06T 5/00* (2006.01)
*H04N 5/225* (2006.01)

(56) References Cited

U.S. PATENT DOCUMENTS

| | | | |
|---|---|---|---|
| 2014/0307057 A1* | 10/2014 | Kang | G02B 5/1895 |
| | | | 348/47 |
| 2016/0360074 A1 | 12/2016 | Winer et al. | |
| 2017/0078649 A1* | 3/2017 | Taubin | G06T 7/521 |
| 2017/0079724 A1 | 3/2017 | Yang et al. | |
| 2018/0275278 A1* | 9/2018 | Yamada | G01C 3/085 |
| 2019/0072770 A1* | 3/2019 | Hall | G01B 5/0014 |
| 2019/0137267 A1 | 5/2019 | Petersen et al. | |
| 2019/0230347 A1* | 7/2019 | Itoh | H04N 13/204 |

OTHER PUBLICATIONS

Schaffer, Phd Thesis. Stereophtogrammetrie MIT Strukturuerterbeleuchtung für Die Schnelle 3D—Vermessung [Stereophotogrammetry with structured illumination for fast 3D surveying.] Submitted to the Council of the Faculty of Physics and Astronomy Friedrich-Schiller-University of Jena. Nov. 2013; 123 pages.
Extended European Search Report dated Feb. 12, 2020 in connection with European Application No. EP 19196605.0.

* cited by examiner

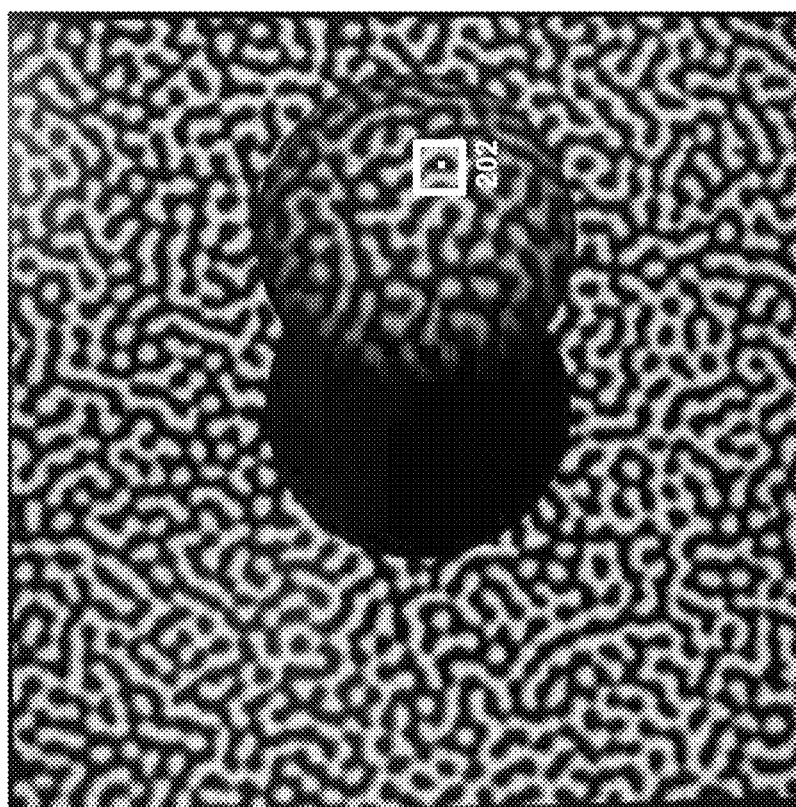
FIG. 3

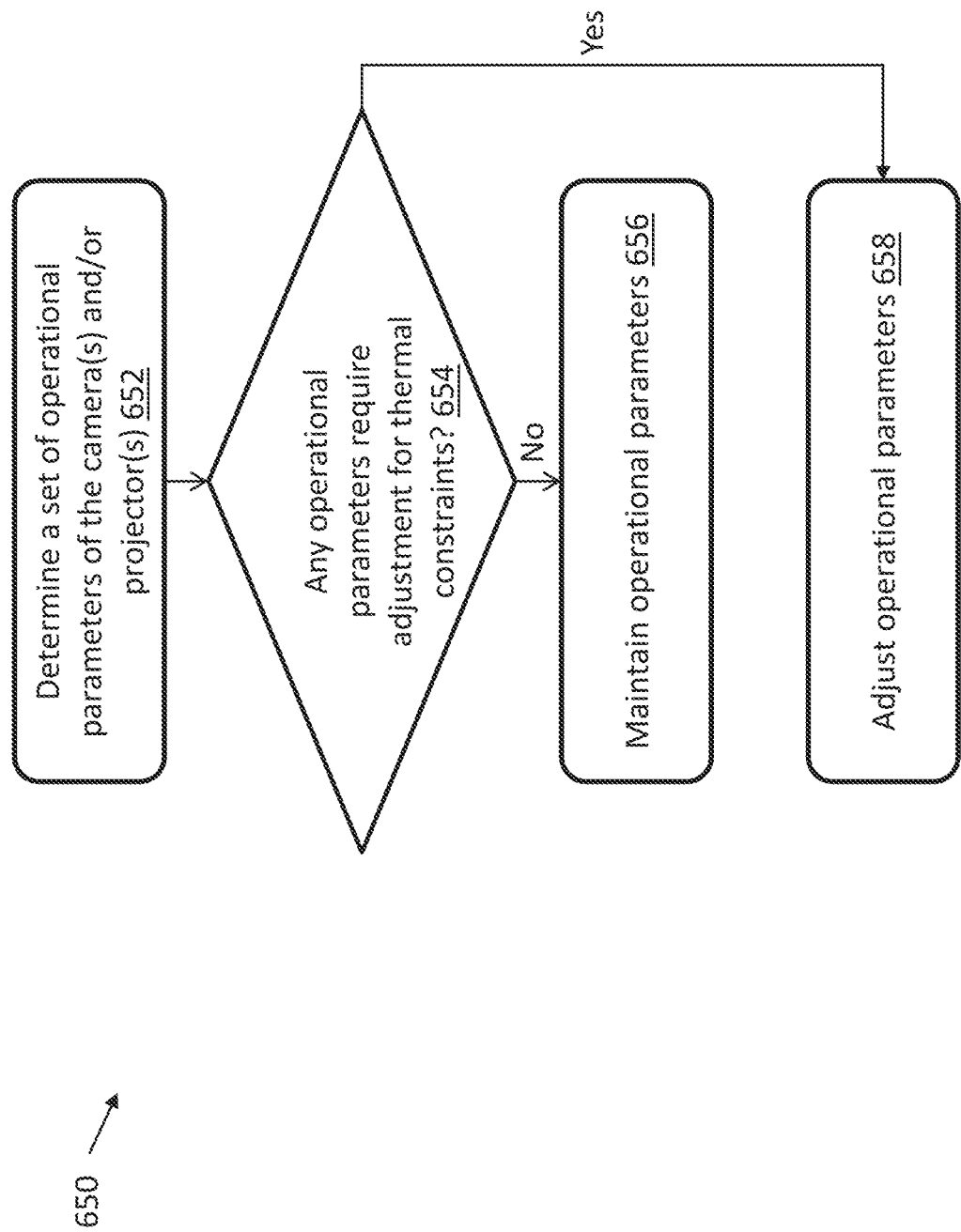

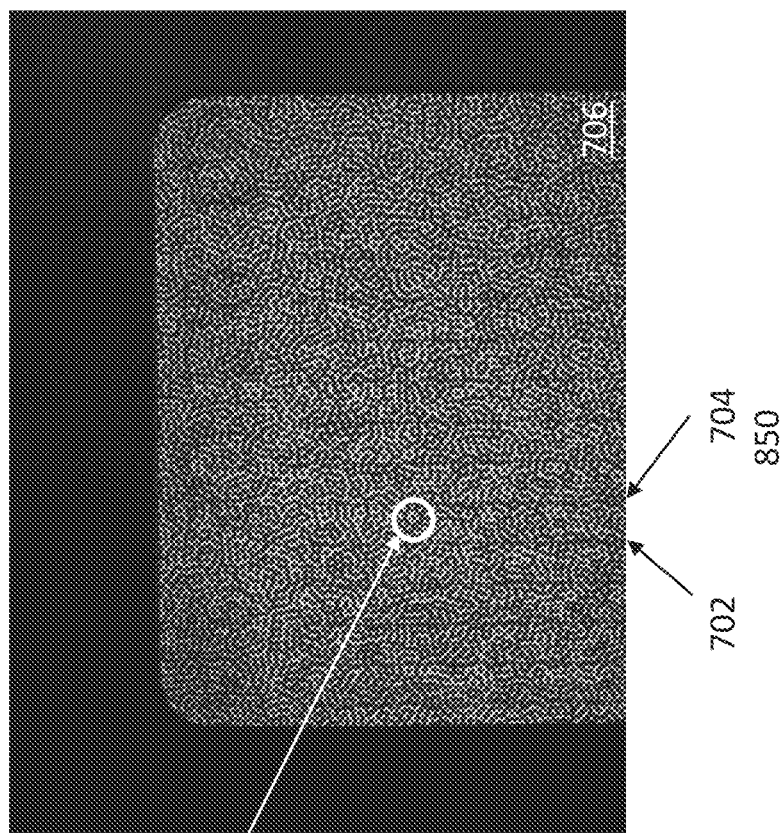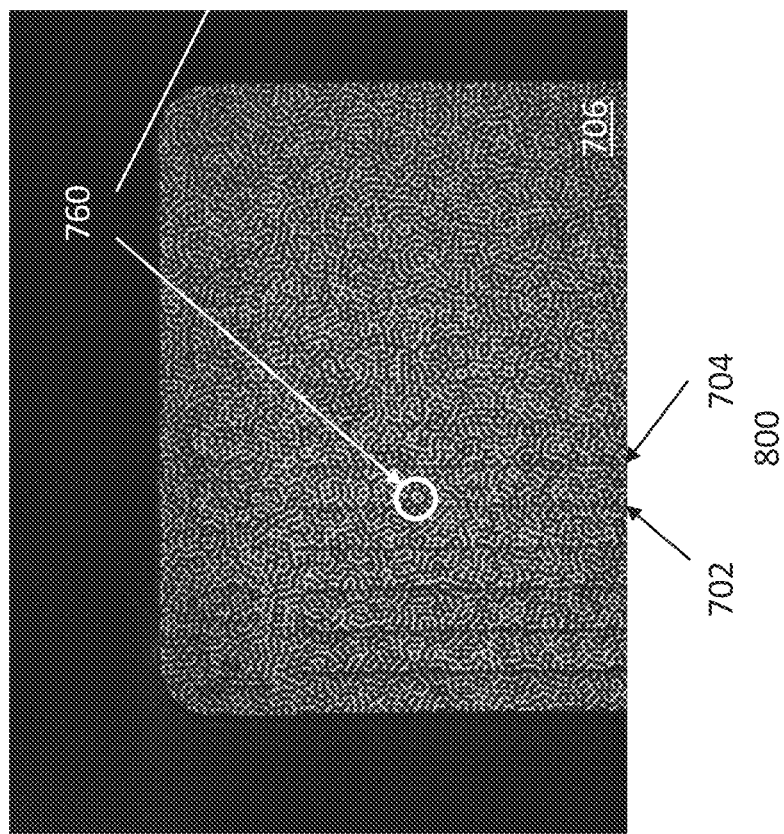
FIG. 8

METHODS AND APPARATUS FOR OPTIMIZING IMAGE ACQUISITION OF OBJECTS SUBJECT TO ILLUMINATION PATTERNS

TECHNICAL FIELD

The techniques described herein relate generally to methods and apparatus for optimizing image acquisition for machine vision, including determining optimal parameters for the acquisition of images of objects subject to randomized illumination patterns.

BACKGROUND OF INVENTION

The use of advanced machine vision systems and their underlying software is increasingly employed in a variety of manufacturing and quality control processes, including medical applications. Machine vision enables quicker, more accurate and repeatable results to be obtained in the production of both mass-produced and custom products. Typical machine vision systems include one or more cameras directed at an area of interest, an illumination source that directs appropriate illumination on the area of interest, a frame grabber/image processing elements that capture and transmit images, a computer or onboard processing device for running the machine vision software application, and a user interface for manipulating the captured images.

One form of 3D vision system is based upon stereo cameras employing at least two cameras arranged in a side-by-side relationship with a baseline of one-to-several inches between the two cameras. Stereo-vision based systems in general are based on epipolar geometry and image rectification. They may use correlation based methods or combining with relaxation techniques to find the correspondence in rectified images from two or more cameras. However, conventional stereo vision systems are limited in their ability to create accurate three-dimensional data reconstructions of objects and/or scenes.

SUMMARY OF INVENTION

In accordance with the disclosed subject matter, apparatus, systems, and methods are provided for optimizing machine vision system parameters (e.g., including parameters of the cameras and/or projectors/illuminators) for acquiring images for 3D processing. The system can be configured to optimize various parameters to determine a minimum frame time that is used to acquire a full sequence of images, while enforcing various constraints. In some embodiments, the constraints are designed so that the parameters are configured in a manner so that the system acquires images with sufficient information for 3D reconstruction, complies with mechanical limitations of the system, and/or to enforces illumination power limitations (e.g., to avoid overheating, damage to the system, injury to operators, and/or the like).

Some aspects relate to a system for determining parameters for image acquisition. The system includes one or more image sensors, wherein each image sensor is arranged to capture a set of images of a scene, and each image sensor comprises a set of adjustable imaging parameters. The system includes a projector configured to project a moving pattern on the scene, wherein the projector comprises a set of adjustable projector parameters. The system includes a processor in communication with the one or more image sensors and the projector, wherein the processor is configured to determine, based on a set of one or more constraints, the set of adjustable projector parameters and the set of adjustable imaging parameters to reduce noise in 3D data generated based on the set of images.

In some examples, the set of adjustable imaging parameters comprises a frame time that indicates a duration of each frame for each image in the set of images, the set of adjustable projector parameters comprises a speed at which the pattern moves over the scene, and determining the set of adjustable projector parameters and the set of adjustable imaging parameters comprises determining a motion speed that minimizes the frame time. The processor can be further configured to adjust the frame time based on a minimum time needed to read out a field of view of the one or more image sensors. The processor can be further configured to adjust the frame time based on a combination of a minimum inter-frame distance and a maximum motor speed. The processor can be further configured to adjust the frame time based on an exposure time at a maximum exposure of an illuminator of the projector. The processor can be further configured to adjust the frame time based on an exposure time of the one or more image sensors, and a set of illumination parameters. The set of illumination parameters can include one or more of an illuminator power during exposure, a maximum average power of the illuminator, a maximum illuminator power, a maximum average power of the illuminator when a peak illuminator power is set to full power, or some combination thereof.

In some examples, determining the set of adjustable projector parameters and the set of adjustable imaging parameters can include determining an initial set of operational parameters for the set of adjustable projector parameters and the set of adjustable imaging parameters, determining one or more parameters in the initial set of parameters violates a thermal constraint of the one or more constraints, and adjusting the one or more parameters to comply with the thermal constraint. Adjusting the one or more parameters to comply with the thermal constraint can include determining a user operational preference, and adjusting the one or more parameters to comply with the thermal constraint based on the user operational preference. The user operational preference can include a low latency setting, and adjusting the one or more parameters comprises adding a delay between successive image sequences. The user operational preference can include a no flash setting, and adjusting the one or more parameters comprises increasing a frame time of the one or more image sensors, reducing a speed of the projector to reduce the speed at which the pattern moves over the scene, or some combination thereof.

Some aspects relate to a computerized method for determining parameters for image acquisition. The method is executed by a processor configured to store a set of one or more constraints, and determine, based on the set of one or more constraints a set of adjustable imaging parameters for each of one or more image sensors in communication with the processor, wherein each image sensor is arranged to capture a set of images of a scene, and a set of adjustable projector parameters for a projector configured to project a moving pattern on the scene, wherein the set of adjustable projector parameters and the set of adjustable imaging parameters reduce noise in 3D data generated based on the set of images.

In some examples, the set of adjustable imaging parameters comprises a frame time that indicates a duration of each frame for each image in the set of images, the set of adjustable projector parameters comprises a speed at which the pattern moves over the scene, and determining the set of adjustable projector parameters and the set of adjustable imaging parameters comprises determining a motion speed that minimizes the frame time. The method can include adjusting the frame time based on a minimum time needed to read out a field of view of the one or more image sensors. The method can include adjusting the frame time based on a combination of a minimum inter-frame distance and a maximum motor speed. The method can include adjusting the frame time based on an exposure time at a maximum exposure of an illuminator of the projector.

In some examples, determining the set of adjustable projector parameters and the set of adjustable imaging parameters can include determining an initial set of operational parameters for the set of adjustable projector parameters and the set of adjustable imaging parameters, determining one or more parameters in the initial set of parameters violates a thermal constraint of the one or more constraints, and adjusting the one or more parameters to comply with the thermal constraint.

Some aspects relate to at least one non-transitory computer-readable storage medium storing processor-executable instructions that, when executed by the at least one computer hardware processor, cause the at least one computer hardware processor to perform the acts of storing a set of one or more constraints, and determining, based on the set of one or more constraints a set of adjustable imaging parameters for each of one or more image sensors in communication with the processor, wherein each image sensor is arranged to capture a set of images of a scene, and a set of adjustable projector parameters for a projector configured to project a moving pattern on the scene, wherein the set of adjustable projector parameters and the set of adjustable imaging parameters reduce noise in 3D data generated based on the set of images.

In some examples, the set of adjustable imaging parameters comprises a frame time that indicates a duration of each frame for each image in the set of images, the set of adjustable projector parameters comprises a speed at which the pattern moves over the scene, and determining the set of adjustable projector parameters and the set of adjustable imaging parameters comprises determining a motion speed that minimizes the frame time. Determining the set of adjustable projector parameters and the set of adjustable imaging parameters can include determining an initial set of operational parameters for the set of adjustable projector parameters and the set of adjustable imaging parameters, determining one or more parameters in the initial set of parameters violates a thermal constraint of the one or more constraints, and adjusting the one or more parameters to comply with the thermal constraint.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3 shows an exemplary pair of stereo images corresponding to one of a series of projected light patterns, according to some embodiments.

FIGS. 6A-6B show exemplary methods for determining operational parameters of a vision system, according to some embodiments.

FIGS. 7-9 shows exemplary images captured using different operational parameters, according to some embodiments.

DETAILED DESCRIPTION OF INVENTION

The techniques discussed herein can be used to analyze the operational parameters of a stereo vision system, such as parameters related to the cameras (e.g., frame time, exposure time, etc.) and/or the pattern projector (e.g., parameters of the illuminator, the speed of the pattern, etc.). The inventors have determined that the configurable parameters for vision systems can create complex considerations to find optimal settings for the system. The inventors have further determined that machine vision systems may allow some parameters to be user-configurable, while other parameters may not be adjustable by a user, which can make it difficult for a user to control the available parameters and achieve images with sufficient noise levels. The inventors have further determined that other considerations may be relevant to the operational parameters, such as thermal considerations and/or other considerations designed to preserve the integrity of the system. The inventors have developed technical improvements to machine vision systems that analyze the system operational parameters and determine the optimal operational parameters for the system. The techniques can include automatically analyzing and adjusting both user-configurable parameters and non-user configurable parameters (e.g., based on user configuration of a set of user-configurable parameters). The techniques can include applying various constraints to the operational parameters to ensure that the system complies with thermal limits and/or other operational constrains of the system to preserve the system integrity during operation.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
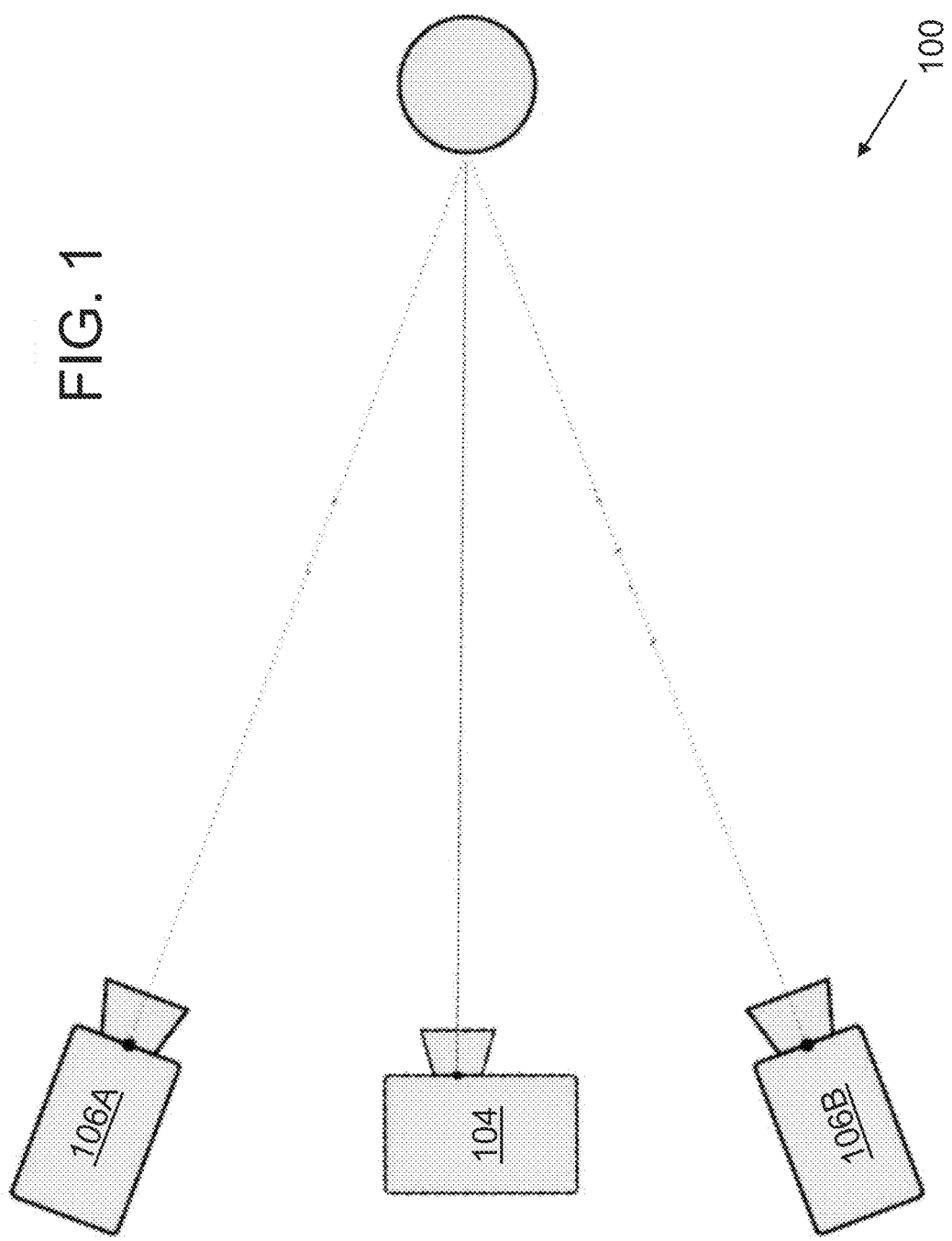
FIG. 1 shows an illustrative embodiment where a projector and two cameras are arranged to capture images of a scene in a manner consistent to produce stereo image correspondence, according to some embodiments.

FIG. 1 shows an illustrative embodiment 100 of a machine vision system with a projector 104 and two cameras 106A, 106B (collectively, cameras 106) that are arranged to capture images of an object or scene 102 in a manner consistent to produce stereo image correspondence. In some embodiments, the projector 104 is employed in order to temporally code image sequences of an object captured using multiple cameras 106. For example, the projector 104 may project a rotating pattern on the object, and each camera may capture an image sequence including 12-16 images (or some other number of images) of the object. Each image comprises a set of pixels that make up the image. In some embodiments, the light pattern may shift in horizontal and/or vertical directions such that the pattern rotates over the object or scene (e.g., without the pattern itself rotating clockwise or counter-clockwise).

Each of the cameras 106 can include a charge-coupled device (CCD) image sensor, a complementary metal-oxide semiconductor (CMOS) image sensor, or another suitable image sensor. In some embodiments, each of the cameras 106 can have a rolling shutter, a global shutter, or another suitable shutter type. In some embodiments, each of the cameras 106 can have a GigE Vision interface, a Universal Serial Bus (USB) interface, a coaxial interface, a FIREWIRE interface, or another suitable interface. In some embodiments, each of the cameras 106 can have one or more smart functions. In some embodiments, each of the cameras 106 can have a C-mount lens, an F-mount lens, an S-mount lens, or another suitable lens type. In some embodiments, each of the cameras 106 can have a spectral filter adapted to a projector, e.g., projector 104, to block environmental light outside the spectral range of the projector.

There are some general parameters that may apply to cameras/image sensors. While examples discussed herein are described in terms of image sensors, the techniques are not so limited and can be applied to other types of cameras and imaging devices. An image sensor's exposure time can refer to the time that light falls on the sensor and is integrated over a certain time period to form a signal, such as a charge image. Some image sensors may not have a physical shutter that blocks light from the sensor to control the exposure time (e.g., like a traditional camera). Therefore, some image sensors can use a global shutter mode that exposes all pixels at the same time, or a rolling shutter mode that exposes rows in a rolling basis such that each row is exposed after a delay from the start of exposure of the previous row. In some embodiments, the system can keep track of when to start and stop integrating the light received at the sensor, such that at the end of the exposure time the image sensor effectively stops integrating the information to produce a charge image of a particular exposure period. In some embodiments, the image sensor can produce a charge image by transferring a charge signal from each of the light sensitive nodes of the sensor (e.g., since the image sensor may not have any mechanical or optical mechanisms to shield the sensors to shut off the light).

The image sensor may have a readout time, during which the image sensor scans through the stored charge image, one line at a time, converts the charge into a signal, and digitally outputs the signal. In some embodiments, the system can be configured so that the readout is performed concurrently with exposure. For example, if timed correctly, the image sensor can read out Frame N while exposing the next frame N+1. In some embodiments, the shutter operation (e.g., a global or rolling shutter) can end the exposure and transfer the charge information into the frame memory, e.g., such that the frame exposure can be timed in a manner that does not disrupt the readout. For example, if an image sensor takes 4 ms to perform a readout, but the image sensor is configured to perform only 1 ms of exposure, the image sensor can be configured to wait to perform an exposure until it is 3 ms into the (4 ms) readout time.

For some image sensors, the frame time refers to the interval from one frame to the next frame when the image sensor is configured to deliver a sequence of frames. For sensors with concurrent exposure and readout, the minimum frame time can be based on approximately the greater of the exposure time and readout time. In some embodiments, the frame time is measured in ms. In some embodiments, the frame rate is 1 second/the minimum frame time, to reflect the number of frames that are achievable in a second at a particular frame time. The frame rate can be measured in Hz. Image sensors can be configured to run slower than the maximum frame rate. For example, when using a system that projects a pattern as discussed herein, it may be desirable to configure an image sensor to run slower than the maximum frame rate for thermal reasons (e.g., due to power dissipated in the projector, to avoid overheating, to avoid potential damage to the image sensor, etc.), for restrictions on how fast the pattern can be moved in the image, and/or the like.

Some systems may allow a user to specify one or more parameters of the image sensor. For example, a system can allow a user to specify the exposure time, a region of interest (e.g., a subset of pixels, such as a rectangle of imager pixels), digitizer span and precision, resolution (e.g., full resolution, subsampling, or binning in X, Y or both dimensions), and/or the like. Some parameters may not be user-configurable, such as the frame time, because it may be difficult for a user to select an appropriate operational value for the parameters.

In some embodiments, some imaging parameters may be relevant for the 3D reconstruction process. For example, as discussed herein, some 3D imaging systems are configured to capture sequences of images that are used to search for correspondences across sequences of different cameras, and ultimately to determine the 3D data. Therefore, some systems may include parameters related to the image sequences, such as a minimum interval between the sequences, number of images in a sequence, delay between successive sequences, and/or the like.

Figure 2:
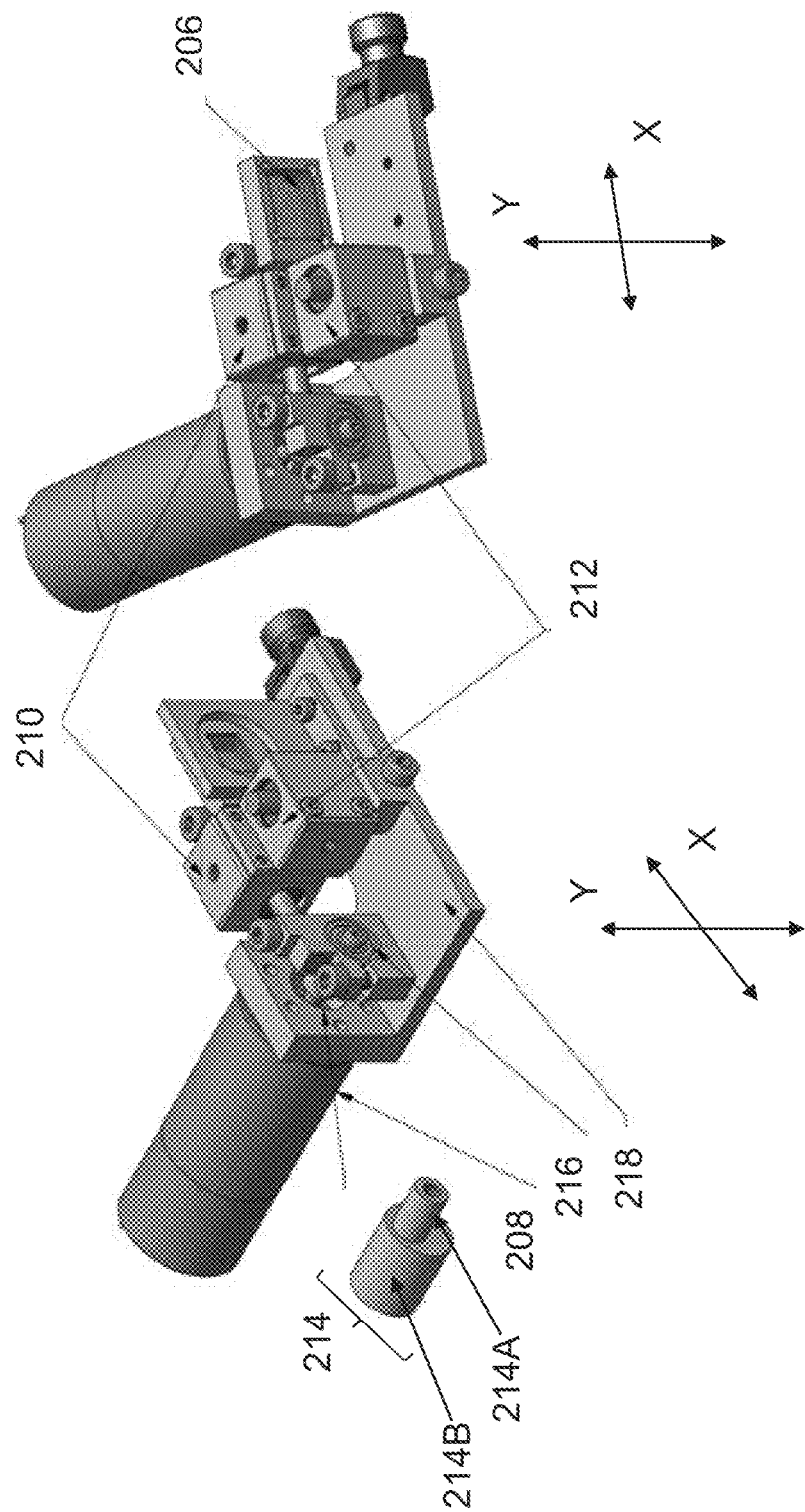
FIG. 2 shows exemplary projector components, according to some embodiments.

FIG. 2 shows exemplary components of a projector, according to some embodiments. FIG. 2 shows two views of the projector components: view one 202, which is a diagonal view from above the projector components, and view two 204, which is a view of the projector components from above that is slightly rotated, with the slide 206 visible. The components include a motor 208 that is used to controllably move the slide 206 using a first component 210 that moves the slide 206 linearly in the x-direction, and a second component 212 that moves the slide 206 linearly in the y-direction (e.g., linear bearings). The motor 208 spins piece 214, which is disposed between the motor 208 and rotatably mounted via a ball bearing connection 216. The piece 214 has an eccentric shape, such that as the motor spins the shaft 214A of the piece 214, and the larger portion 214B, which is coupled to the shaft in an off-axis manner, such that the variation caused by the larger portion 214B as the motor 208 rotates the shaft 214A causes the first and second components 210 and 212 to cooperatively shift the slide 206 along the X and Y axes in a manner that does not rotate the slide 206. The components of the projector are mounted to, and supported by, the baseplate 218.

In some embodiments, the projector can include various parameters and/or constraints. In some embodiments, the parameters or constraints can be based on the motor speed, a desired amount of movement of the mask, parameters related to the projector illuminator (e.g., an LED illuminator), and/or the like. For example, some parameters may relate to the motor speed, such as the maximum and/or minimum motor speed. The maximum motor speed can specify the maximum speed that the motor can obtain in millirevs per second (e.g., 6000 millirev/sec) while being controlled to a desired accuracy (e.g. +/−20%). The minimum motor speed can specify the minimum speed the motor can run at while being controlled to a desired accuracy (e.g. +/−20%).

As another example, some parameters can relate to the motion of the mask, such as the sequence motion and the frame motion. The sequence motion can specify a desired amount of mask motion over a complete sequence of images. Sequence motion can be specified in units of image pixels (e.g., 180 pixels, 240 pixels, 300 pixels, and/or the like). In some embodiments, the sequence motion can be specified in motor revolutions. The frame motion can specify a desired amount of motion during one complete frame time (e.g., from the start of one frame to the start of the next frame). The frame motion can be specified in units of image pixels (e.g., 5 pixels, 10 pixels, 15 pixels, and/or the like). In some embodiments, a sequence motion constraint is used when acquiring a sequence of images for 3D reconstruction. In some embodiments, a frame motion constraint is used when acquiring single frames (e.g., for test purposes). In some embodiments, the projector parameters and/or constraints may be set by the manufacturer, and therefore may not be adjusted by a user.

Some projector parameters can be based on the illumination intensity of the illuminator that is used to illuminate the mask and project a resulting pattern onto the scene. Exemplary LED illuminator operational parameters can include maximum LED input power, maximum continuous power, a maximum average power when the peak pulse power is set to full power (100%), maximum peak power duration (e.g., the maximum duration when using full power (100%)), and/or the like. The radiometric output power can be approximated as 0.3 times the input power implying that the thermal power dissipated in the LEDs is approximately 0.7 times the input power. LED illuminators often have a cooling device, such as a fan-cooled heatsink and/or a passive heatsink. Depending on how the LED illuminator is cooled, it may change the operational parameters of the illuminator. The system may keep track of whether a fan has been detected and is running properly. An exemplary set of LED illuminator parameters are provided below for an LED illuminator with a fan-cooled heatsink and an LED illuminator with a passive heatsink:

| Operational Parameter | Illuminator with no fan | Illuminator with fan |
|---|---|---|
| Maximum Power (W) | 96 | 96 |
| Maximum Continuous Power (W) | 12 | 43 |
| Maximum Average Power At Peak (W) | 12 | 24 |
| Maximum Peak Duration (millisec) | 100 | 100 |

FIG. 3 shows an exemplary pair of stereo images 300 and 350 corresponding to one of a series of projected light patterns. For example, the projector 104 may project a light pattern on the object, and the cameras 106 may capture the stereo images 300 and 350. In some embodiments, in order to reconstruct three-dimensional data from stereo image sequences from two cameras, corresponding pairs of pixels, such as pixels 302 and 352, may need to be found between the images from each camera.

As a general matter, some 3D approaches match left/right features of the images 300 and 350. In some embodiments, sharp edges can be used to determine disparities between the images in order to perform the matching. However, smooth surfaces (e.g., surfaces without markings and/or abrupt angles) may not return sufficient information, such as the circle shown in images 300 and 350. The pattern projection technique discussed herein can be used to capture a sequence of images with sufficient information to match left/right image features, such that the time sequence of pixel values show brightness over time to create a unique signature along possible paths of matching pixels. Thus, for example, the pattern can provide sufficient information to perform a correspondence search even if the object does not have sufficient naturally-occurring features in the scene to otherwise perform a stereo image correspondence search.

Figure 4:
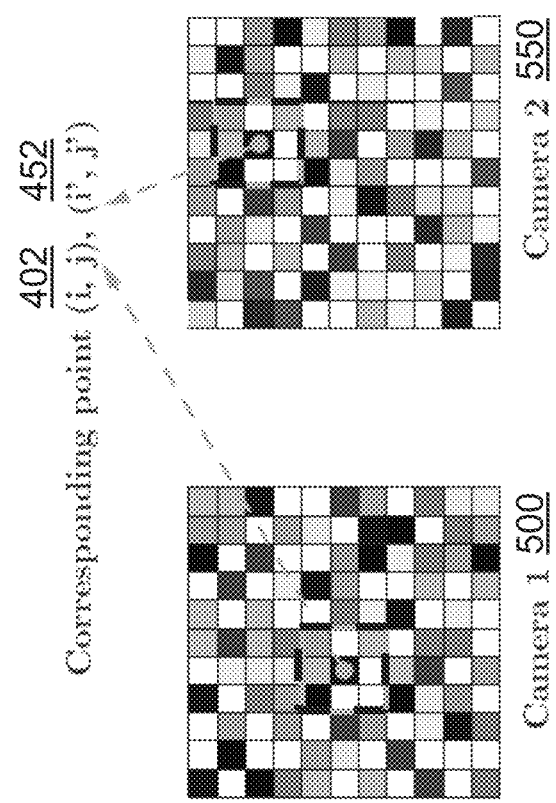
FIG. 4 shows an illustrative pair of stereo images of a scene, according to some embodiments.

FIG. 4 shows an illustrative pair of stereo images 400 and 450 (and associated pixels) with corresponding pixels 402 and 452, which represent the same portion of the pattern projected in the two images 400 and 450. For example, as discussed above, the projector 104 may project a light pattern on the scene, and the cameras 106 may capture the stereo images 400 and 450. The captured stereo images 400 and 450 can be used to identify correspondences across the two pixels. In some embodiments, sequences of stereo images captured over time are used to identify correspondences.

Figure 5:
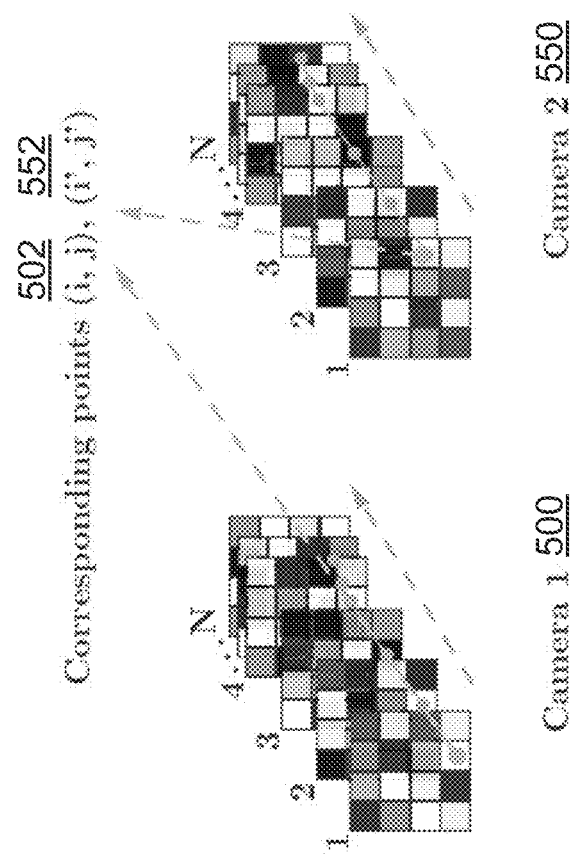
FIG. 5 shows an illustrative pair of stereo-temporal image sequences corresponding to a series of light patterns projected on a scene, according to some embodiments.

Following from the single pair of stereo images shown in FIG. 4, FIG. 5 shows, when the projector 104 successively projects different light patterns on the scene over time, the cameras 106 may capture the stereo-temporal image sequences 500 and 550 with corresponding temporal pixels 502 and 552. Each of cameras 106 may capture a sequences of images 1, 2, 3, 4, . . . N over time. Temporal pixels 502 and 552 are based on the pixels (i,j) and (i',j') across the stereo-temporal image sequences 500 and 550, respectively. Over time, each temporal pixel includes an ordered list of gray values: $G\_i\_j\_t$ where t indicates the discrete temporal instances 1, 2, 3, 4, . . . N. Based on the changing illumination-intensities created in the scene, the system can solve for correspondences between the cameras. In some embodiments, 3D data can be generated with an almost arbitrary motion of the mask/pattern.

While 3D imaging techniques can use a moving pattern to improve correspondence searching, various parameters may affect the noise level of the images, which in-turn will affect the correspondence search and ultimate 3D data and associated noise. In some embodiments, the precision of the 3D data (e.g., the noise of the 3D data) can be affected based on the projector and/or camera parameters. For example, the 3D data can be affected based on the movement of the mask in combination with one or more of the exposure time, frame time and illuminator intensity. The techniques herein can be used to determine optimal parameters for the system, including for the projector and/or cameras. For example, the techniques can determine parameters related to the projector, such as mask motion, based on other system parameters, such as the image sensor exposure time and/or frame rate, as well as other projector parameters, such as illuminator intensity.

One or more of the various parameters of the image sensor(s) and/or the projector can be adjusted (e.g., by a user and/or factory-set prior to shipment to a user). As discussed herein, some of the parameters may be user-configurable, while the user may not be able to configure other parameters. For example, parameters can be adjusted to control how much signal is collected from the object. The amount of collected signal can be influenced by a number of factors, such as how dark or light the object is, how far the object is from the camera, how powerful the LEDs are that are illuminating the object, the f-number of the lens (e.g., the ratio of the system's focal length to the diameter of the entrance diameter of the pupil), and/or the responsivity of the sensor. As a general matter, it can be desirable to configure the system, including the cameras and projector, to acquire an image with a good signal. For example, if the image is too dark, then the values may be indistinguishable, whereas if the image is too bright then the sensor was saturated.

Figure 6A:
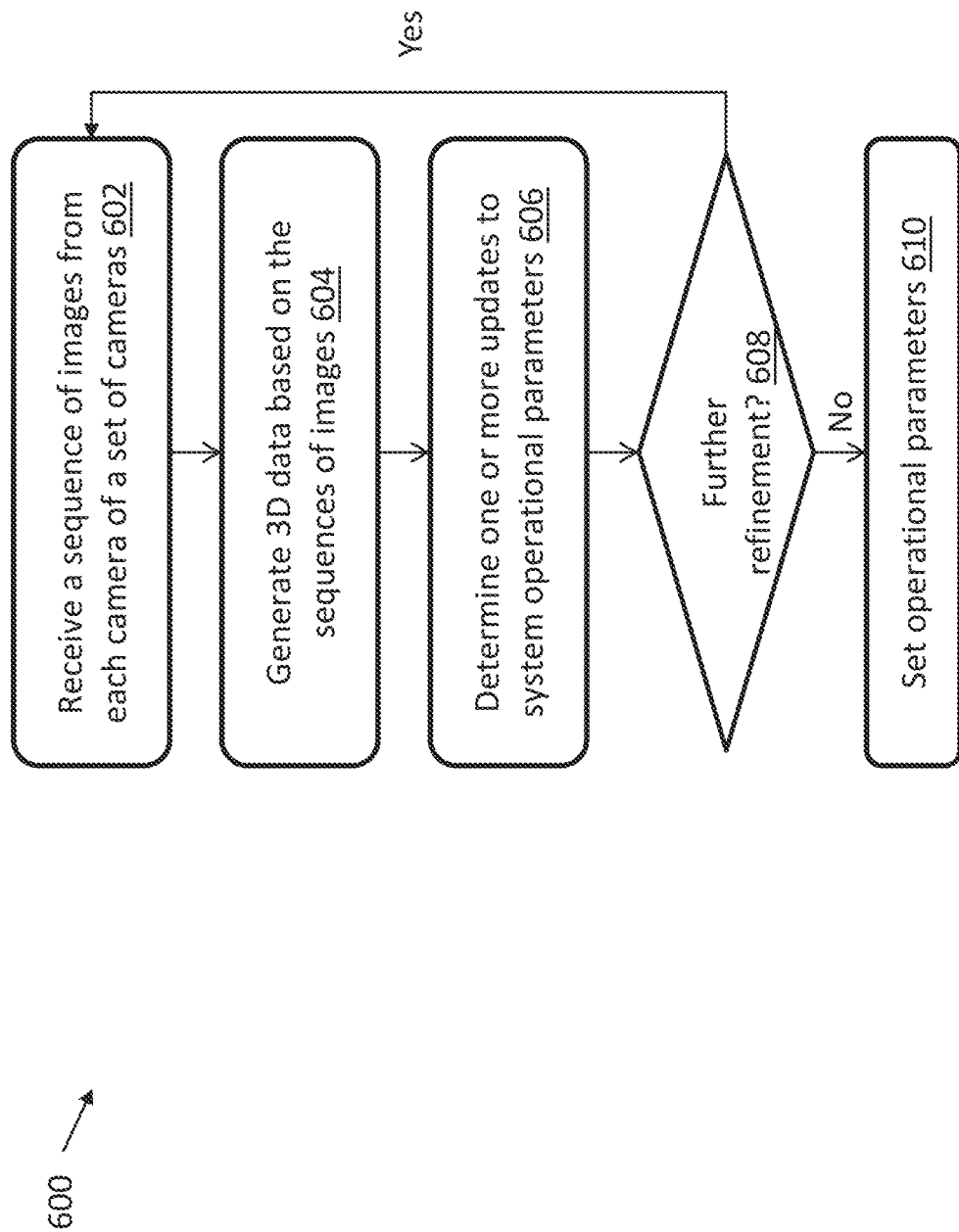

FIG. 6A shows an exemplary computerized method 600 for configuring the system, including the cameras and/or projector, according to some embodiments. The techniques discussed herein, including method 600 and method 650 discussed in conjunction with FIG. 6B, may be performed on any suitable computing system (e.g., a general purpose computing device (CPU), a graphics processing unit (GPU), a field-programmable gate array device (FPGA), an application-specific integrated circuit device (ASIC), an ARM-based device, or another suitable computing system), as aspects of the technology described herein are not limited in this respect. The computing device may be a computing device connected to the camera(s) and projector(s), and or portions of the cameras (e.g., smart cameras). As a general matter, the system is configured to control the projector and sensors in a manner to create a sufficient pattern by the projector to obtain sufficient images from the sensors for processing.

At step 602, the computing device receives a sequence of images from each camera from a set of cameras (e.g., cameras 106 in FIG. 1). At step 604, the computing device generates 3D data based on the sequences of images. As discussed herein, the 3D generation process can include finding correspondences between the sequences of images to generate the 3D data. At step 606, the system determines one or more updates to the system's operational parameters based on the 3D data. For example, the system can adjust operational parameters of the cameras and/or projector, as discussed further herein. In some embodiments, the system can adjust the operational parameters without generating the 3D data. For example, the system may analyze changes to user-configurable parameters to determine whether the parameters would not result in proper settings and/or would violate system constraints. For example, the system may execute method 650 shown in FIG. 6B, discussed further below. At step 608, the system determines whether the operational parameters need further refinement. For example, if the operational parameters did not achieve a noise level of the 3D data below a noise threshold, the method can proceed back to step 602 using the updated parameters based on step 606. Otherwise, the method proceeds to step 610 and sets the operational parameters.

Referring to step 606, in some embodiments the system can determine that the 3D comprises noise. For example, in some embodiments, the system can analyze the 3D data to determine noise, such as by noting where there are missing pixels (e.g., where the 3D range could not be reconstructed), and adjusting parameters to minimize areas of missing pixels. As discussed herein, the techniques can include adjusting total exposure, e.g., by adjusting exposure time and/or projector brightness.

Method 600 in FIG. 6A shows an example of how the system can be configured to use feedback to determine configure the system (e.g., via step 608). This potentially iterative process with feedback is explained for exemplary purposes only, and is not intended to be limiting. For example, in some embodiments, the techniques can derive a set of constraints (e.g., pattern motion constraints, thermal constraints) and create a set of acquisition parameters that meet those constraints without using an iterative process.

FIG. 6B shows an exemplary computerized method 650 for checking the configuration of parameters, including those of the cameras and/or projector, according to some embodiments. As discussed above, method 650 may be executed as part of analyzing the noise of 3D data (e.g., as part of step 606) and/or without generating 3D data. At step 652, the computing device determines a set of operational parameters of the camera(s) and/or projector(s). At step 654, the computing device determines whether any of the operational parameters in the set of operational parameters require adjustment based on a set of thermal constraints of the camera(s). If no, the method proceeds to step 656, and the computing device maintains the set of operational parameters. If yes, the method proceeds to step 658, and the computing device adjusts one or more of the operational parameters in the set of operational parameters to comply with the set of thermal constraints.

As discussed in detail herein, when an image acquisition sequence is set up for the system, the system can determine a certain set of initial operational parameters. In some embodiments, the system initially sets the frame time based on system parameters. For example, the system can set the frame time to the minimum time needed to read out the field of view. As discussed further below in conjunction with step 654, the system then evaluates the initial set of operational parameters against various constraints. The constraints can include physical system constraints (e.g., motor speed, illuminator power, etc.), other constraints, such as thermal constraints, and/or the like.

Referring to step 652, the system may determine sensor hardware parameters (e.g., for use in calculating operational parameters). For example, the system may determine an exposure limited time, a readout limited time, and/or a minimum frame time. The minimum frame time can be calculated based on the maximum of the exposure limited time and the readout limited time. The exposure limited time can be calculated based on the sum of the exposure time plus a small constant overhead (e.g., which can be used to achieve a minimum interval between one exposure ending and the next exposure starting). The readout limited time may vary for a sensor depending on the mode(s) supported by the sensor. For example, the sensor may have a frame readout time for full resolution mode and for a subsampling mode (e.g., a 2×2 binning mode). A subsampling mode can, for example, output values for only some of the pixels, while ignoring others. For example, a 2×2 binning mode can divide the region of interest into 2×2 pixel chunks and only output the upper left pixel of each chunk, ignoring the other three pixels. As another example, a 2×2 binning mode can divide the region of interest into 2×2 pixel chunks, and only output one value for each chunk (e.g., the sum of the 4 pixels in the chunk).

In some examples, the readout region can be adjusted depending on the mode. For example, for some sensors, the readout region could be adjusted to less than the full sensor size in full resolution mode with a corresponding decrease in readout limited frame time (e.g., to increase speed). As another example, for some sensors, the binning mode may not support a limited readout region.

In some embodiments, as discussed above, a user may have control over parameter(s) of the projector and/or image sensors, while other parameters are not adjustable by the user. For example, the user may be able to control the exposure time of the camera(s) and the illumination intensity of the projector. As a general matter, the product of these two parameters can be considered to control the ultimate image, since, e.g., a 25% intensity for a 4 ms exposure time can achieve the same image as 50% intensity for 2 ms exposure time, in terms of brightness of the grayscale. However, this may not always be the case. For example, if there are moving objects in the field of view, or a moving mask/pattern as discussed herein, then there may be a difference between running for a 2 ms exposure time compared to a 4 ms exposure time (e.g., since the 4 ms exposure time may cause blur).

In some embodiments, the system can determine operational parameters of the system. The system can confirm and/or adjust user-specified settings and/or other system parameters to provide for optimal image acquisition (e.g., to handle motion blur, to comply with physical limitations of the projector, etc.). For example, the system may evaluate the operational parameters based on one or more constraints that need to be met in order to achieve image acquisition with sufficient clarity for processing. In some embodiments, the system may determine a constraint related to the minimum amount of motion of the projected pattern. For example, some considerations may include a minimum amount for the pattern to move between frames, a minimum amount that the pattern will move over the whole image sequence, and/or both. For example, if the pattern does not move enough, whether across individual frames and/or the sequence, then the images may be too close to each other such that they do not capture sufficient movement of the pattern to capture unique signature information for the correspondence search. Therefore, the system can be configured to set a minimum threshold of how much the pattern should move, including throughout the whole sequence and/or throughout individual frames.

In some embodiments, the system can determine a sequence motion constraint, which can set the minimum amount of apparent motion of the projected pattern in the images during a sequence of images, such that the images will be different enough from each other to give sufficient information in the sequence for good depth extraction. As discussed above, in some embodiments the projector moves the pattern so that it maintains same orientation (e.g., such that the pattern remains in the focal plane of lens, and moves in a 2 mm diameter circle projected out to field of view). In some embodiments, the sequence motion can be expressed in terms of motor rotations per second (e.g., the pattern moves in a circular arc at "X" rps). In some embodiments, the sequence motion can be expressed in terms of a certain number of pixels that the patterns moves in total over the entire image sequence. For example, since the pattern is projected in a manner that smoothly varies with a characteristic spatial frequency, the system can determine that it takes a certain number of pixels of movement of the pattern in the image for the average change of the image pixels to be enough to contribute useful new information to the reconstruction process, and extrapolate out that movement across the entire image sequence. For example, if it takes ten (10) pixels to go from black to white, it might take less, perhaps five (5) or so pixels, to change the pattern enough so that the next image has enough new information to add to the reconstruction. This number can be extrapolated out to specify the amount of movement across the full sequence.

In some embodiments, the constraints can control the pattern so that it does not move too far during the time of a single exposure (e.g., since too much movement can create blur, such that patterns of the images start to become undistinguishable across the sequence). For example, the system may determine a frame exposure ratio (FER) constraint, which can set a desired amount of motion during exposure to avoid excessive blur in any single image. For example, the FER can specify a minimum ratio of the frame period to the exposure time. The FER can also be specified using ranges and/or a minimum and maximum value. For example, a FER can be set with a minimum value, a default value, and a maximum value. In some embodiments, the FER constraint sets a maximum amount of motion. In some embodiments, the FER constraint can be determined based on the calculated minimum amount of motion needed for a frame, to specify that the system wants no more than a percentage of the motion to occur during an exposure.

In some embodiments, the system can use the FER constraint to determine the readout time. For example, a FER of 2 can specify that the readout time of each frame is a minimum of twice as long as the exposure time. If the system did not need to comply with an FER, then the system run at a frame rate limited only by exposure time and readout time. In some embodiments, the FER configures the system to lengthen the frame time than otherwise compared to the one allowed by the readout time. For example, with a 4 ms readout time and a 1 ms exposure time, the system in that configuration meets an FER of 2. As the user starts to turn up the exposure time (e.g., to obtain a brighter image), the system can turn the exposure time up to 2 ms and still have the same readout time of 4 ms and meet an FER of 2. Once the system sets the exposure time so that it exceeds 2 ms, then the system can be configured to also increase the frame time as well to maintain an FER of 2.0. For example, if the system sets the exposure time to 3 ms for a good exposure, to meet an FER of 2.0 the system can also set the minimum frame time to 6 ms (i.e., two (2) times the exposure time of 3 ms). Even though the system can read data out in 4 ms and therefore maintain an exposure time of 3 ms, the FER can cause the system to add some extra idle time and only acquire one frame every 6 ms.

In some embodiments, the speed of the projector can be adjusted to control blur. As discussed above, the projector may have a certain range of motor speeds, such that the system can set the motor speed within the range and achieve smooth pattern motion (e.g., where the motor may not be able to smoothly move the pattern at speeds outside of the range). The system can take the motor speed into consideration when adjusting the imager settings, and/or vice versus. For example, for very fast frame times (e.g., where the system may only process a center portion of the image, and therefore only read out a reduced amount of data, such as ¼ of the acquired data), the system can increase the motor speed to move the pattern fast enough so that the system will acquire the necessary pattern motion distance within the fast frame time. As the frame speed is increased, the system can use limits on the motor speed to prevent the frame time from increasing too high (e.g., such that for a particular frame time, the motor may not be able to move fast enough and still provide smooth movement of the pattern).

Therefore, as discussed herein, constraints can be imposed on system parameters, including imager parameters and/or projector parameters. The system can use the determined constraints (e.g., the sequence motion and/or frame exposure ratio constraints) to select one or more operational parameters of the system, e.g., to provide for certain image qualities, to control the projected mask pattern, and/or the like. In some embodiments, the constraints may cause the system to reduce certain parameter(s) that would be otherwise allowable for use in the system. For example, the system can select a frame time for the sensor(s), such as a frame time that is longer than the minimum frame time determined by the sensor limitations. For example, the FER constraint can be used to determine camera settings that balance blur of the pattern in and/or across the images. As another example, the system can select a motor speed for the motor (e.g., motor 208 in FIG. 2) that is within the valid operational range of the projector's mechanical system even though it does not use the maximum motor speed. For example, if the system is increasing exposure time, in order to maintain a certain amount of pattern motion over the sequence of images, the system can reduce the motor speed to move the pattern slower (e.g., so that the pattern moves less during the longer exposure time to reduce blur).

Referring to step 654, during normal operation the sensors each acquire a sequence of images as discussed above (e.g., 12 to 48 images) that are used to create a single 3D image. When capturing these images, an LED illuminator in the projector is turned on to project the pattern from the slide 206 onto the scene. Since LEDs create thermal considerations, in some embodiments the system can check the set of operational parameters determined in step 652 against a set of one or more thermal constraints. As discussed herein, operational parameters of the illuminator can include various parameters such as max power, max continuous power, max average power at peak power, and/or max power duration. In some embodiments, the operational parameters of the LED illuminator are not user-adjustable. For example, the LED illuminator parameters may be adjusted in the manufacturing process (e.g., if it is determined that they are too loose or too restrictive), but not otherwise adjustable once deployed. As discussed herein in conjunction with step 652, the system may allow a user to control certain parameters of the imager, such as the exposure time and/or the LED brightness setting (e.g., which is effectively the percentage of maximum power to use). At step 654, the system determines whether any of the power constraints would be violated based on a user's desired settings (e.g., if the system does a continuous stream of sequences at the user's desired frame rate). The method proceeds to either step 656 or 658, accordingly, which are discussed further herein.

In some embodiments, there may be different thermal considerations for different system components. For example, the LED illuminator may be able to withstand 150 C operational temperatures, however operating at such a temperature may cause the image sensors to fail (e.g., since the image sensors may only be able to operate up to 60-70 C), and/or may be unsafe for certain applications since the box may be too hot for someone to touch the imaging box. In some embodiments, long-term constraints can be set, such as a low long-term power constraint. For example, while for certain settings the LED illuminator may operate without issue, the LED illuminator could burn out if left on for too long of a period (e.g., for a second or more of straight illumination).

In some embodiments, the system can check other system parameters when executing step 654. For example, the system may allow a user to specify operational preferences that may influence steps 654-658. In some embodiments, the user may be able to configure the acquisition timing, which can specify whether the user prefers to acquire the sequence of images using a high frame rate (e.g., as high of a frame rate as desired, and therefore to capture the sequence as quickly as possible), or whether the user is amenable to slowing down the frame rate. In some embodiments, the user's preferences may influence whether the system has any perceivable flash caused by the LED illuminator. For example, the acquisition timing can be set to a low latency setting to capture individual image sequences as fast as possible. In some embodiments, any extra time needed to enforce the thermal limits as discussed in conjunction with step 658 can be added at the end of the sequence, which can allow for fast sequence acquisition but may cause a perceivable pause between sequence acquisition, as discussed below. As another example, the acquisition timing can be set to a no flash setting to avoid any user-perceivable flashing of the illumination. In some embodiments, other parameters can be adjusted as discussed further herein, e.g., which may slow the sequence acquisition time but may comply with thermal constraints.

Referring further to step 654, the system may perform a calibration step. For example, during calibration the sensors can be configured to acquire images without illumination (e.g., with the LED illuminator of the projector in an "off" state). For such calibration images, the system need not check the thermal constraints as discussed in step 654 since the LED illuminator is "off." For example, the frame time can be the minimum set by the sensor hardware limitations, without consideration of the thermal constraints. The system can perform the calibration step to create a transform from 2D coordinates on the sensors to 3D physical coordinates within the system's measurement volume, for example.

Referring to step 666, in some embodiments at step 654 the system determines that none of the sequences at the determined frame rate would violate the thermal constraints, such that at step 666 the system maintains the operational parameters. In some embodiments, while the individual image sequences may not violate thermal constraints, over time the sequences may cause damage to the system. For example, if the LED illuminator is on at 50% power and for 50% frame time, depending on the LED illuminator (e.g., an LED illuminator without a fan-cooled heatsink), while the LED illuminator may not overheat instantly, over time the settings may eventually cause the system to over-heat. In some embodiments, the system determines whether the operational parameters need to be adjusted to protect the system, such as against long-term over-heating.

In some embodiments, the system can take into account user-configurable parameters if the system needs to adjust parameters. For example, the system may determine that the acquisition timing is set to a low latency setting, as discussed herein, such that the user prefers to acquire individual sequences as fast as possible. The system can maintain the frame rate as unchanged, and can add an extra period for the LED illuminator to be "off" at the end of each sequence before the next sequence can be triggered. As discussed herein, adding an additional delay between sequence captures can cause a perceivable flashing of the illuminator when acquiring continuous sequences. In some embodiments, the benefit of the additional delay can outweigh the delay between sequence captures (e.g., including a perceivable flashing). A fast sequence acquisition can be desirable in, for example, industrial situations. For example, once a robot moves a part, it may be desirable to obtain information on that moved part as quickly as possible. While there may be a delay between sequence acquisition, such delay may be negligible because once the 3D calculation is made, it may take time for the robot to move to perform a next calculation. Therefore, such high-speed sequence acquisition can allow the system to perform 3D calculations a quickly as possible, with a delay between calculations.

Referring to step 658, if an image sequence will violate thermal constraints, the computing device adjusts one or more of the operational parameters in the set of operational parameters to comply with the set of thermal constraints (e.g., including if even just a single image sequence would violate thermal constraints). In some embodiments, the system can determine to adjust one or more of the operational parameters by taking into account user-configurable parameters. For example, the system may determine that the acquisition timing is set to a no flash setting, as discussed herein. In some embodiments, the system can increase the frame time, for example, to adjust the operational parameters. In some embodiments, the system can reduce the rotator speed, as needed, to maintain the sequence motion constraint. Adjusting the operational parameters, including the frame time and/or rotator speed, can achieve generally the same sequence cycle rate as step 656, but with a longer latency from the trigger to the acquisition of a series of images to the completion of acquiring the sequence. In some embodiments, the system can pulse the LED illuminator at the frame rate, which may be high enough to avoid a perceivable flashing of the LED illuminator. Such modifications of the operational parameters can be beneficial for applications in which a user will perceive the system illumination. For example, such modifications can be suited for imaging that involves people, such as for medical applications and/or industrial applications where people will be exposed to the imaging (e.g., and may otherwise require a shrouding to avoid a constantly-perceivable flashing). For example, if the system is configured to flash for 1 ms every 4 ms, such a configuration would be perceived as constant brightness by human eyes, whereas a constant intense illumination for 50 ms followed by an off period of 150 ms would be perceived as an intense 5 Hz flashing.

In some embodiments, the frame time may be lengthened to adjust the parameters. The system can analyze the exposure time of a sequence based on certain projector settings to determine how to adjust the parameters. For example, the system can determine whether the product of the LED illuminator setting and the total amount of exposure time needed for the image sequence is greater than the product of the max peak duration and the max power. If greater, then the system may determine that the thermal limit could be exceeded during the sequence. The system could enforce the average thermal limit per frame by lengthening the frame time.

In some embodiments, the parameters can be adjusted depending on the application of the 3D vision system. In some embodiments, the parameters may be adjusted to ensure the maximum number of best quality images that can be acquired per second. For example, this may be desirable for robot guidance or high-speed machine placement. In some embodiments, it may be desirable to obtain a certain number of images per second with a certain quality (e.g., which may not necessarily be the best achievable quality). For example, it may be desirable to acquire a certain number of images for medical imaging applications.

Referring back to step 606, in some embodiments the techniques can adjust the parameters empirically based on the reconstructed 3D data. For example, the techniques may determine optimum parameters (e.g., exposure time, frame time, etc.) empirically by measuring 3D reconstruction accuracy. For example, the system may be configured so that a user can adjust the frame time of the imager and the speed at which the projector moves the pattern over the scene. The system can determine the set of projector parameters and/or imaging parameters by determining a motion speed that minimizes the frame time. In some embodiments, the system can adjust the frame time based on a minimum time needed to read out a field of view of the one or more image sensors. In some embodiments, the system can adjust the frame time based on a combination of the minimum inter-frame distance and the maximum motor speed. For example, the system may adjust the frame time to a longer frame time than otherwise would be used by the system. In some embodiments, the system can adjust the frame time based on the exposure time at the maximum exposure of the LED illuminator. For example, the system may reduce the motor speed and increase the frame time to be longer than would otherwise be used by the system (e.g., to adjust for a reduced motor speed). In some embodiments, the system can adjust the frame time based on the exposure time of the image sensors and a set of illumination parameters (e.g., the parameters of the LED illuminator discussed herein).

In some embodiments, the system can be configured to allow multiple sequential acquisition sequences (e.g., two or more), with different acquisition parameters to be commanded by a single trigger event. For example, it may be desirable to specify different parameters for sequential sequences to allow for HDR (High Dynamic Range) imaging. In some embodiments, the system can be configured to optimize the sequences independently. For example, each sequence may be configured with different motor speeds. In some embodiments, different motor speeds for sequential image sequences can cause a short pause between sequences while the motor changes speed. In some embodiments, the system can be configured to determine a same motor speed for both sequences that provides acceptable images. In some embodiments, using a same motor speed can avoid a pause between the sequences.

In some embodiments, the system may be configured so that a general setting can be adjusted, which in turn adjusts a set of constraints (e.g., constraints of both the projector and/or cameras). For example, a single setting may adjust both exposure time and the LED illuminator power to provide for an integrated exposure. In some embodiments, the setting can be adjusted by a user. In some embodiments, the setting can be adjusted by an auto-exposure control algorithm (e.g., designed to provide desired image grey scale response).

Thus, referring to steps 654-658 generally, the system may or may not adjust the operational parameters. For example, if the system determines that the motor and/or frame time parameters would allow continuous system operation without violating the thermal limits, then the system can run continuously as configured (e.g., at the maximum frame rate). As another example, if the system determines that the thermal limits prevent acquiring even a single image sequence at that rate, then the system must increase the frame time. As a further example, if the system determines that the thermal limits would allow a single sequence at the configured rate, but that the thermal limits would be violated with continuous operation, then the system can adjust the operational parameters (e.g., according to user specified settings regarding whether to increase the frame time (e.g., such that there is no perceivable flash), or to leave the frame time unadjusted and to add an illuminator off time between sequences (e.g., for low latency), as discussed further herein).

Two illustrative, non-limiting examples are provided below. The examples provide a determined frame time and sequence time, which the system determines based on the specified parameters for frame count (e.g., the number of frames acquired for each sequence), raw LED brightness, exposure time, and the acquisition mode (in this example, low latency as discussed herein).

EXAMPLE 1

Frame Count=24
LED Raw Brightness=255 (100% of max power)
Exposure Time=1 msec
Acquisition Mode=Low Latency
No fan present
Frame time=3.6 msec (limited by readout rate)

The average power during the sequence is approximately 27 Watts (96 W*28% duty cycle, where the duty cycle is 1 msec on, 2.6 msec off). To meet the 12 W no fan continuous power limit, additional illuminator off time is required at the end of each sequence. Sequence time=213 msec (88 msec latency from a trigger to perform a sequence capture to completing the sequence capture, and 125 msec illuminator off time until the next trigger can be accepted).

EXAMPLE 2

Frame Count=24
LED Raw Brightness=255 (100% of max power)
Exposure Time=1 msec
Acquisition Mode=NoFlash
No fan present
In this case the frame time is lengthened so that the LED duty cycle drops to 12% during the sequence. This allows continuous operation at the 12% thermal limit.
Frame time=8.8 msec
Sequence time=211 msec (8.8 msec Frame time*24 frames)

Figure 7:
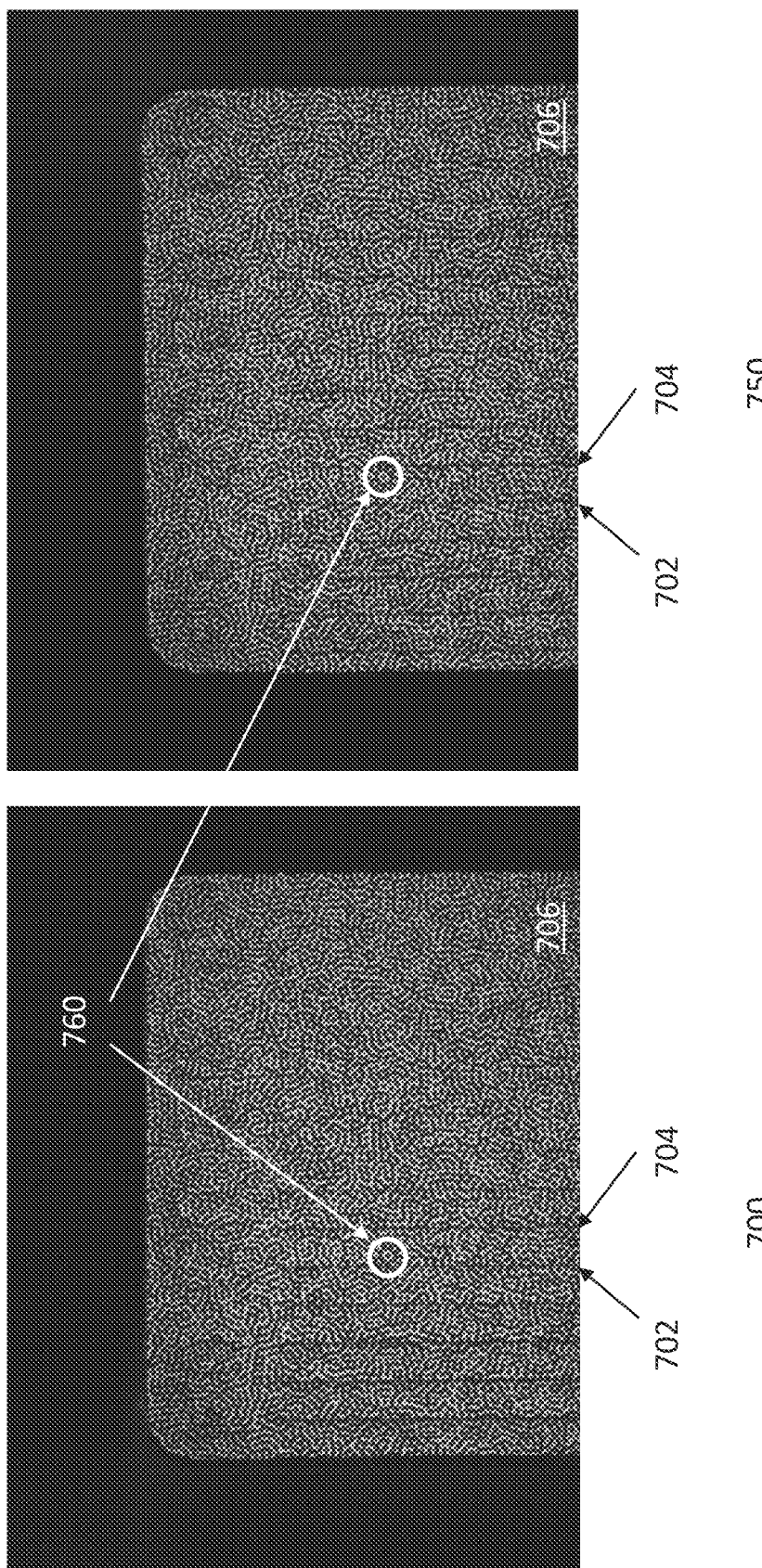
Figure 9:
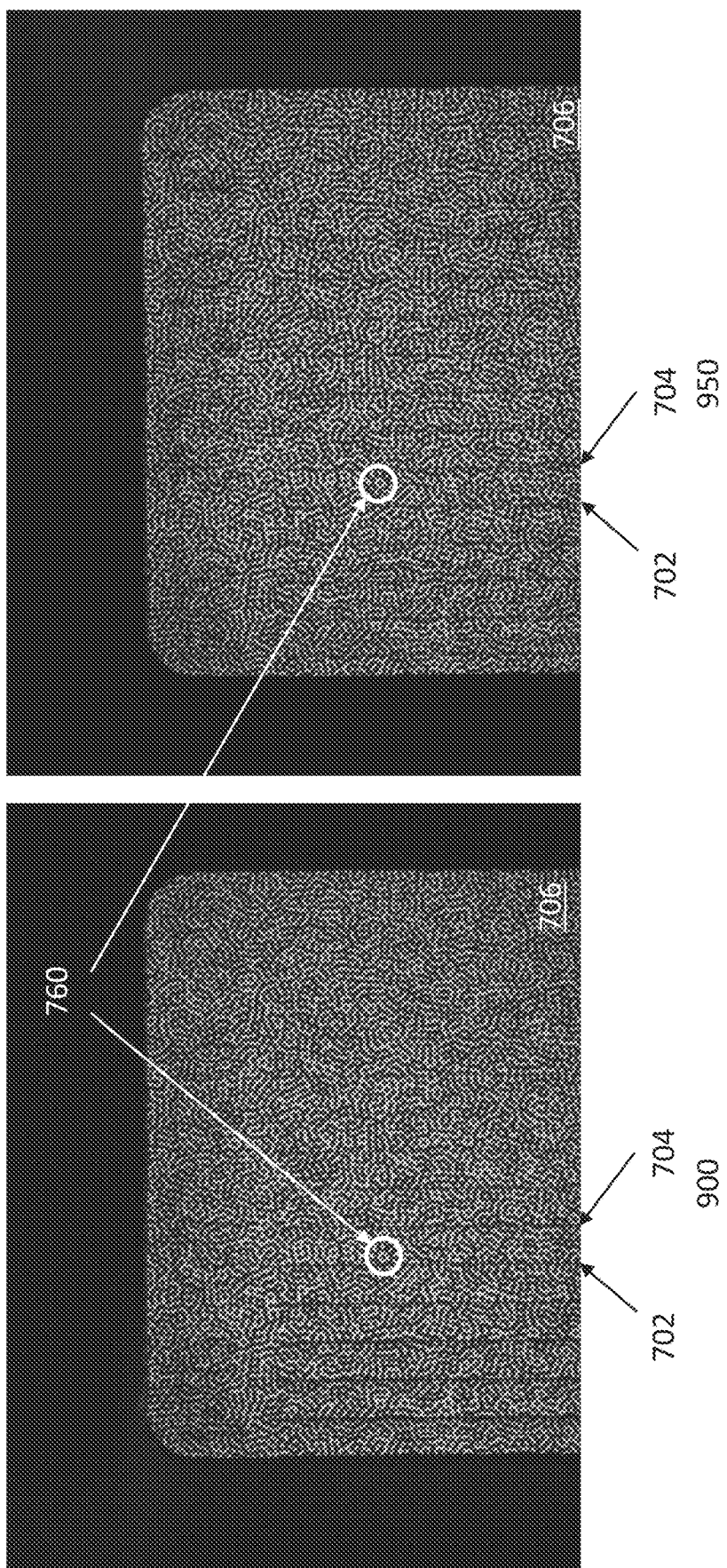

FIGS. 7-9 show examples of image pairs 700 and 750, 800 and 850, and 900 and 950, respectively. The images 700, 800 and 900 are successively acquired images by a first camera, and the images 750, 850 and 950 are successively acquired images of the same scene and pattern by a second camera. As a general matter, these image sequences show some spatial shift between the pattern captured by the first camera and the pattern captured by the second camera, and also show movement of the pattern over time across the image pairs. In particular, the images 700, 800 and 900 captured by the first camera show a first perspective of the first and second contours 702 and 704 of the object 706, which run vertically along the object 706 in the images. Images 750, 850 and 950 captured by the second camera show a different spatial perspective of the first and second contours 702 and 704. For example, when comparing the image pairs, the circular portion of the pattern marked by 760 in the images is more towards contour 702 in the images 700, 800 and 900, compared to it being more towards contour 704 in the images 750, 850 and 950 (e.g., since the contours 702, 704 include a vertical component that projects "outwards" from the page, and the first camera views the object 706 from a left vantage point while the second camera views the object 706 from a right vantage point). Additionally, when comparing the image sequences, the pattern moves over time across the image pairs from the right to the left, as can be seen with a small shift of the pattern at each time instant captured by the image pairs in FIGS. 7, 8 and 9, respectively (e.g., the portion 760 does not appear to overlay the contour 702 in image 700, whereas it appears to overlay the contour 702 in image 900).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the principles described herein. Accordingly, the foregoing description and drawings are by way of example only.

What is claimed is:

1. A system for determining parameters for image acquisition, the system comprising:
    one or more image sensors, wherein each image sensor:
        is arranged to capture a set of images of a scene; and
        each image sensor comprises a set of adjustable imaging parameters;
    a projector configured to project a moving pattern on the scene, wherein the projector comprises a set of adjustable projector parameters; and
    a processor in communication with the one or more image sensors and the projector, wherein the processor is configured to determine, based on a set of one or more operational and/or thermal constraints associated with the projector:
        the set of adjustable projector parameters to control the projector to project the moving pattern on the scene, and
        the set of adjustable imaging parameters to control the one or more image sensors to capture the set of images of the moving pattern on the scene,
        wherein the set of adjustable projector parameters and the set of adjustable imaging parameters are determined to reduce noise level in 3D data generated based on the set of images below a noise threshold, the noise threshold being indicative of an acceptable maximum portion of the 3D data that cannot be reconstructed from the set of images due to noise.

2. The system of claim 1, wherein:
    the set of adjustable imaging parameters comprises a frame time that indicates a duration of each frame for each image in the set of images;
    the set of adjustable projector parameters comprises a speed at which the pattern moves over the scene; and
    determining the set of adjustable projector parameters and the set of adjustable imaging parameters comprises determining a motion speed that minimizes the frame time.

3. The system of claim 2, wherein the processor is further configured to adjust the frame time based on a minimum time needed to read out a field of view of the one or more image sensors.

4. The system of claim 2, wherein the processor is further configured to adjust the frame time based on a combination of a minimum inter-frame distance and a maximum motor speed.

5. The system of claim 2, wherein the processor is further configured to adjust the frame time based on an exposure time at a maximum exposure of an illuminator of the projector.

6. The system of claim 2, wherein the processor is further configured to adjust the frame time based on an exposure time of the one or more image sensors and a set of illumination parameters.

7. The system of claim 6, wherein the set of illumination parameters comprise one or more of an illuminator power during exposure, a maximum average power of the illuminator, a maximum illuminator power, a maximum average power of the illuminator when a peak illuminator power is set to full power, or some combination thereof.

8. The system of claim 1, wherein determining the set of adjustable projector parameters and the set of adjustable imaging parameters comprises:
    determining an initial set of operational parameters for the set of adjustable projector parameters and the set of adjustable imaging parameters;
    determining one or more parameters in the initial set of operational parameters violates a thermal constraint of the one or more operational and/or thermal constraints; and
    adjusting the one or more parameters to comply with the thermal constraint.

9. The system of claim 8, wherein adjusting the one or more parameters to comply with the thermal constraint comprises:
    determining a user operational preference; and
    adjusting the one or more parameters to comply with the thermal constraint based on the user operational preference.

10. The system of claim 9, wherein:
    the user operational preference comprises a low latency setting; and
    adjusting the one or more parameters comprises adding a delay between successive image sequences.

11. The system of claim 9, wherein:
    the user operational preference comprises a no flash setting; and
    adjusting the one or more parameters comprises increasing a frame time of the one or more image sensors, reducing a speed of the projector to reduce the speed at which the pattern moves over the scene, or some combination thereof.

12. A computerized method for determining parameters for image acquisition, the method being executed by a processor configured to:
    store a set of one or more operational and/or thermal constraints associated with a projector; and
    determine, based on the set of one or more operational and/or thermal constraints:
        a set of adjustable imaging parameters for each of one or more image sensors in communication with the processor, wherein each image sensor is arranged to capture a set of images of a moving pattern on a scene; and
        a set of adjustable projector parameters for the projector configured to project the moving pattern on the scene;
    wherein the set of adjustable projector parameters and the set of adjustable imaging parameters are determined to reduce noise level in 3D data generated based on the set of images below a noise threshold, the noise threshold being indicative of an acceptable maximum portion of the 3D data that cannot be reconstructed from the set of images due to noise.

13. The method of claim 12, wherein:
the set of adjustable imaging parameters comprises a frame time that indicates a duration of each frame for each image in the set of images;
the set of adjustable projector parameters comprises a speed at which the pattern moves over the scene; and
determining the set of adjustable projector parameters and the set of adjustable imaging parameters comprises determining a motion speed that minimizes the frame time.

14. The method of claim 13, further comprising adjusting the frame time based on a minimum time needed to read out a field of view of the one or more image sensors.

15. The method of claim 13, further comprising adjusting the frame time based on a combination of a minimum inter-frame distance and a maximum motor speed.

16. The method of claim 13, further comprising adjusting the frame time based on an exposure time at a maximum exposure of an illuminator of the projector.

17. The method of claim 12, wherein determining the set of adjustable projector parameters and the set of adjustable imaging parameters comprises:
determining an initial set of operational parameters for the set of adjustable projector parameters and the set of adjustable imaging parameters;
determining one or more parameters in the initial set of operational parameters violates a thermal constraint of the one or more operational and/or thermal constraints; and
adjusting the one or more parameters to comply with the thermal constraint.

18. At least one non-transitory computer-readable storage medium storing processor-executable instructions that, when executed by the at least one computer hardware processor, cause the at least one computer hardware processor to perform the acts of:
storing a set of one or more operational and/or thermal constraints associated with a projector; and
determining, based on the set of one or more operational and/or thermal constraints:
a set of adjustable imaging parameters for each of one or more image sensors in communication with the at least one computer hardware processor, wherein each image sensor is arranged to capture a set of images of a moving pattern on a scene; and
a set of adjustable projector parameters for the projector configured to project the moving pattern on the scene;
wherein the set of adjustable projector parameters and the set of adjustable imaging parameters are determined to reduce noise level in 3D data generated based on the set of images below a noise threshold, the noise threshold being indicative of an acceptable maximum portion of the 3D data that cannot be reconstructed from the set of images due to noise.

19. The non-transitory computer readable medium of claim 18, wherein:
the set of adjustable imaging parameters comprises a frame time that indicates a duration of each frame for each image in the set of images;
the set of adjustable projector parameters comprises a speed at which the pattern moves over the scene; and
determining the set of adjustable projector parameters and the set of adjustable imaging parameters comprises determining a motion speed that minimizes the frame time.

20. The non-transitory computer readable medium of claim 18, wherein determining the set of adjustable projector parameters and the set of adjustable imaging parameters comprises:
determining an initial set of operational parameters for the set of adjustable projector parameters and the set of adjustable imaging parameters;
determining one or more parameters in the initial set of operational parameters violates a thermal constraint of the one or more operational and/or thermal constraints; and
adjusting the one or more parameters to comply with the thermal constraint.

* * * * *